(12) United States Patent
Iwamoto et al.

(10) Patent No.: US 11,319,015 B2
(45) Date of Patent: May 3, 2022

(54) TRAVELING VEHICLE (71) Applicant: KAWASAKI JUKOGYO KABUSHIKI KAISHA, Kobe (JP)

(72) Inventors: Taro Iwamoto, Suma-ku (JP); Hiroshi Ishii, Tarumi-ku (JP); Takeshi Nakajima, Hyogo-ku (JP); Kazuya Nagasaka, Akashi (JP); Taichi Inaba, Nada-ku (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 49 days.

(21) Appl. No.: 16/947,295

(22) Filed: Jul. 27, 2020

(65) Prior Publication Data
US 2021/0031859 A1 Feb. 4, 2021

(30) Foreign Application Priority Data

Jul. 30, 2019 (JP) .............................. JP2019-140137

(51) Int. Cl.
*B62K 5/027* (2013.01)
*B62K 5/10* (2013.01)
(Continued)

(52) U.S. Cl.
CPC ................ *B62K 5/027* (2013.01); *B62K 5/10* (2013.01); *B62K 25/16* (2013.01); *B62J 25/00* (2013.01);
(Continued)

(58) Field of Classification Search
CPC . B62K 5/02; B62K 5/10; B62K 25/16; B62K 5/08; B62K 21/02; B62K 21/18;
(Continued)

(56) References Cited

U.S. PATENT DOCUMENTS

| 6,604,757 B1 * | 8/2003 | Huang | ..................... B62D 1/12 |
| | | | 280/778 |
| 6,709,013 B2 * | 3/2004 | Renfroe | ................... B62D 1/12 |
| | | | 280/269 |

(Continued)

FOREIGN PATENT DOCUMENTS

| EP | 1362779 A2 * | 11/2003 | ........... B60G 21/007 |
| EP | 1511641 | 3/2005 | |

(Continued)

*Primary Examiner* — Paul N Dickson
*Assistant Examiner* — Tiffany L Webb
(74) *Attorney, Agent, or Firm* — Fay Kaplun & Marcin, LLP (57) ABSTRACT

A traveling vehicle includes a vehicle body, a left swing part, a right swing part, and an interlocking link mechanism. The left swing part and the right swing part are supported on the vehicle body so as to be swingable in the up-down direction, respectively. A left support part supporting a left front wheel is provided on a front part of the left swing part so as to be rotatable about a left steering shaft. A right support part supporting a right front wheel is provided at a front part of the right swing part so as to be rotatable about a right steering shaft. The interlocking link mechanism rotates one of the left support part and the right support part in conjunction with the other. The interlocking link mechanism is provided between the left support part and the right support part.

18 Claims, 7 Drawing Sheets

(51) Int. Cl.
  *B62K 25/16*  (2006.01)
  *B62J 25/00*  (2020.01)
  *B62K 25/04*  (2006.01)

(52) U.S. Cl.
  CPC .... *B62K 2025/045* (2013.01); *B62K 2204/00* (2013.01)

(58) Field of Classification Search
  CPC . B60G 3/20; B60G 2300/122; B60G 2300/45
  See application file for complete search history.

(56) References Cited

U.S. PATENT DOCUMENTS

| | | | | |
|---|---|---|---|---|
| 7,543,833 | B2* | 6/2009 | Landmark | B60G 3/145 |
| | | | | 280/124.128 |
| 8,251,375 | B2* | 8/2012 | Hara | B62D 9/02 |
| | | | | 280/5.509 |
| 8,746,717 | B2* | 6/2014 | Tsujii | B62K 25/24 |
| | | | | 280/124.103 |
| 9,616,922 | B2* | 4/2017 | Suzuki | B62D 11/20 |
| 2018/0281878 | A1* | 10/2018 | Aoki | B62D 1/046 |
| 2019/0382068 | A1* | 12/2019 | Nagasaka | B62K 5/08 |

FOREIGN PATENT DOCUMENTS

| | | | |
|---|---|---|---|
| EP | 2154050 | 2/2010 | |
| EP | 2514660 | 10/2012 | |
| FR | 2950313 A1 * | 3/2011 | ............... B62K 9/02 |
| JP | 6210852 | 10/2017 | |

* cited by examiner

TRAVELING VEHICLE

CROSS-REFERENCE TO RELATED APPLICATIONS

The present application claims priority under 35 U.S.C. § 119 to Japanese Patent Application Serial No. 2019-140137 filed on Jul. 30, 2019. The contents of this application are incorporated herein by reference in their entirety.

BACKGROUND OF THE INVENTION

Field of the Invention

The present invention relates to a traveling vehicle.

Discussion of the Background

A traveling vehicle including a pair of front wheels in left and right has been conventionally known. Japanese Patent No. 6210852 discloses a saddle type vehicle that is a traveling vehicle of this type.

In the saddle type vehicle disclosed in Japanese Patent No. 6210852, a handle stem is fixed to distal end of each front wheel axle of the left and right front wheels. The handle stem extends upward so as to incline obliquely rearward from the distal end of the front wheel axle. A handle grip is provided on an upper portion of the handle stem. Further, this saddle type vehicle is provided with a steering mechanism including a cylinder mechanism as a steering device. The steering mechanism is used to adjust the steering angles of the left and right wheels.

In the configuration of Japanese Patent No. 6210852 described above, it is necessary to individually switch the steering angles of the left and right front wheels on both the left and right sides of the saddle type vehicle. Thus, there is room for improvement in terms of improving the operability for steering the traveling vehicle.

SUMMARY OF THE INVENTION

According to one aspect of the present invention, a traveling vehicle with the following configuration is provided. That is, the traveling vehicle includes a vehicle body, a left swing part, a right swing part, a left support part, a left front wheel, a right support part, a right front wheel, and an interlocking link mechanism. The left swing part is arranged on one side in a vehicle width direction, is provided so as to extend forward from the vehicle body, and is supported on the vehicle body so as to be swingable in an up-down direction. The right swing part is arranged on the other side in the vehicle width direction, is provided so as to extend forward from the vehicle body, and is supported on the vehicle body so as to be swingable in the up-down direction. The left support part is provided on a front part of the left swing part so as to be rotatable about a left steering shaft. The left front wheel is rotatably supported by the left support part and is configured to change an orientation of the left front wheel by rotation of the left support part about the left steering shaft. The right support part is provided at a front part of the right swing part so as to be rotatable about a right steering shaft. The right front wheel is rotatably supported by the right support part and is configured to change an orientation of the right front wheel by rotation of the right support part about the right steering shaft. The interlocking link mechanism is configured to rotate one of the left support part and the right support part in conjunction with the other when the other of the left support part and the right support part rotates. The interlocking link mechanism is provided between the left support part and the right support part.

Thus, in the traveling vehicle including the left front wheel and the right front wheel, it is possible to realize that the vehicle body leans. Further, based on the rotation of one of the left support part and the right support part, the rotation state of the other of the left support part and right support part can be changed That is, based on the steering angle of one of the left front wheel and the right front wheel corresponding to the one of the left support part and the right support part, the steering angle of the other of the left front wheel and the right front wheel corresponding to the other of the left support part and the right support part can be changed. Therefore, it is possible to realize good operability in steering the traveling vehicle.

As a result, the steering operability can be improved for a traveling vehicle including left front wheels and right front wheels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
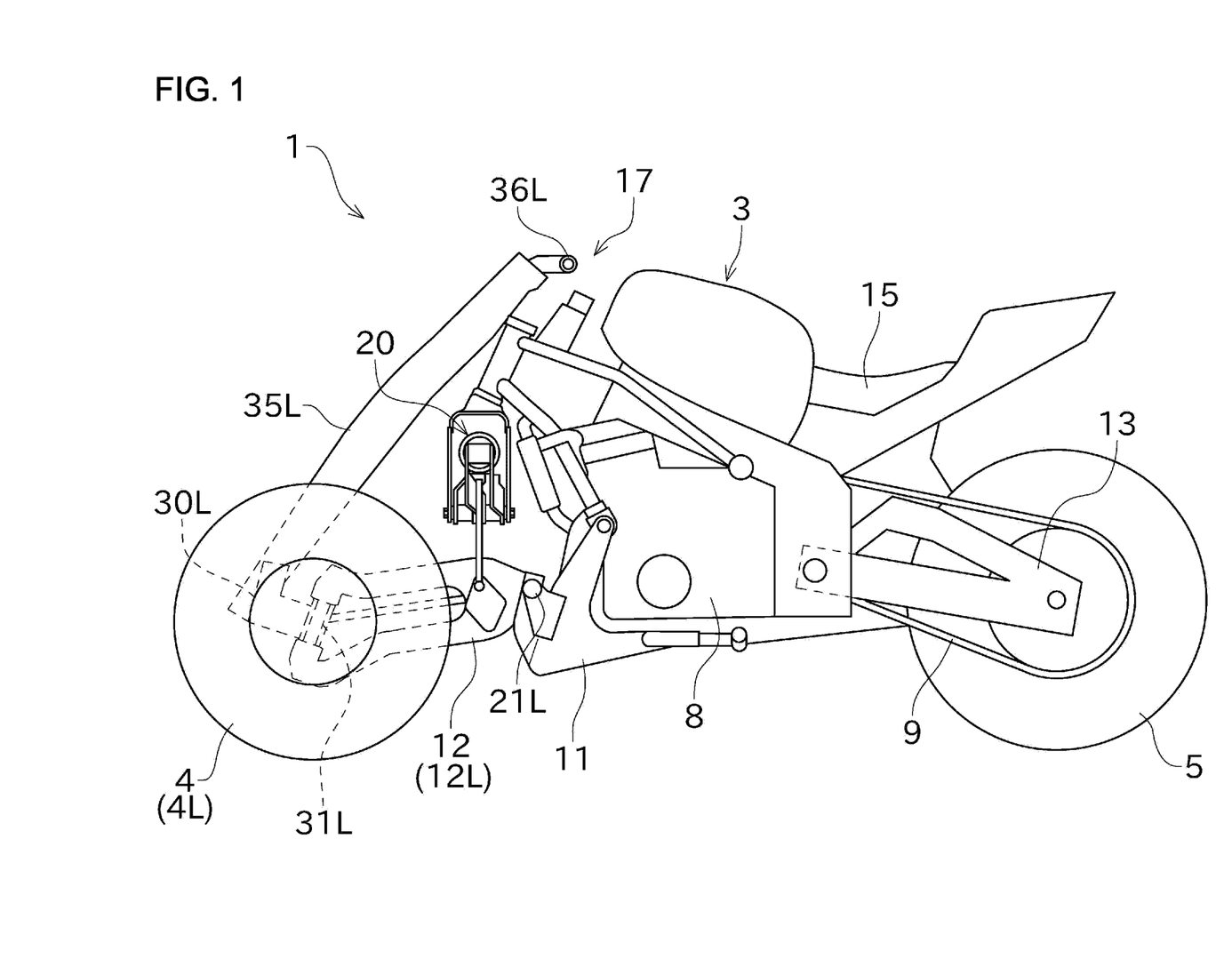
FIG. 1 is a side view of a traveling vehicle according to an embodiment of the present invention.

The embodiments will now be described with reference to the accompanying drawings, wherein like reference numerals designate corresponding or identical elements throughout the various drawings. Firstly, a traveling vehicle 1 of this embodiment will be generally described with reference to FIG. 1. FIG. 1 is a side view of the traveling vehicle 1 according to this embodiment.

The traveling vehicle 1 shown in FIG. 1 includes a vehicle body 3, a front wheel 4, and a rear wheel 5. The traveling vehicle 1 is a saddle type vehicle in this embodiment. A driver rides on the traveling vehicle 1 while straddling the vehicle body 3 to drive the traveling vehicle 1. It is noted that the type of traveling vehicle is not limited to the saddle type vehicle.

In the following description, front, rear, left, right, up, and down mean front, rear, left, right, up, and down as seen from the driver who rides on the traveling vehicle 1, respectively, unless otherwise specified. A left-right direction corresponds to a vehicle width direction of the traveling vehicle 1.

Two front wheels 4 are arranged in pairs in left and right relative to the vehicle body 3, and is provided at a front part of the traveling vehicle 1. The left and right front wheels 4 are arranged at predetermined intervals in the left-right direction. One rear wheel 5 is provided at a center of the vehicle body 3 in the left-right direction, and is arranged at a rear part of the traveling vehicle 1.

The vehicle body 3 supports a drive source for driving the traveling vehicle 1. In this embodiment, an engine 8 shown in FIG. 1 is used as the drive source. The engine 8 functions as a power unit for driving the rear wheel 5 that is a driving wheel, and is configured as a gasoline engine, for example. A driving force generated in the engine 8 is shifted by a transmission gear (not shown) and transmitted to the rear wheel 5 via a drive chain 9. It is noted that, instead of the engine 8, an electric motor may be used as the drive source of the traveling vehicle 1, for example.

The vehicle body 3 includes a vehicle body frame 11. The vehicle body frame 11 is a strength component serving as a framework for supporting the engine 8, etc., and is formed by using a metal pipe, for example. Left and right front wheel arms 12 and a rear wheel arm 13 are attached to the vehicle body frame 11. The left and right front wheels 4 are rotatably supported by the left and right front wheel arms 12, respectively. The rear wheel 5 is rotatably supported by the rear wheel arm 13.

A seat 15 on which the driver sits is provided in an upper part of the vehicle body 3. A steering handle 17 operable by the driver sitting on the seat 15 is arranged forward of the seat 15. The steering handle 17 is connected to the front wheels 4. The vehicle body 3 is coupled with the front wheels 4 via a suspension device 20.

Figure 2:
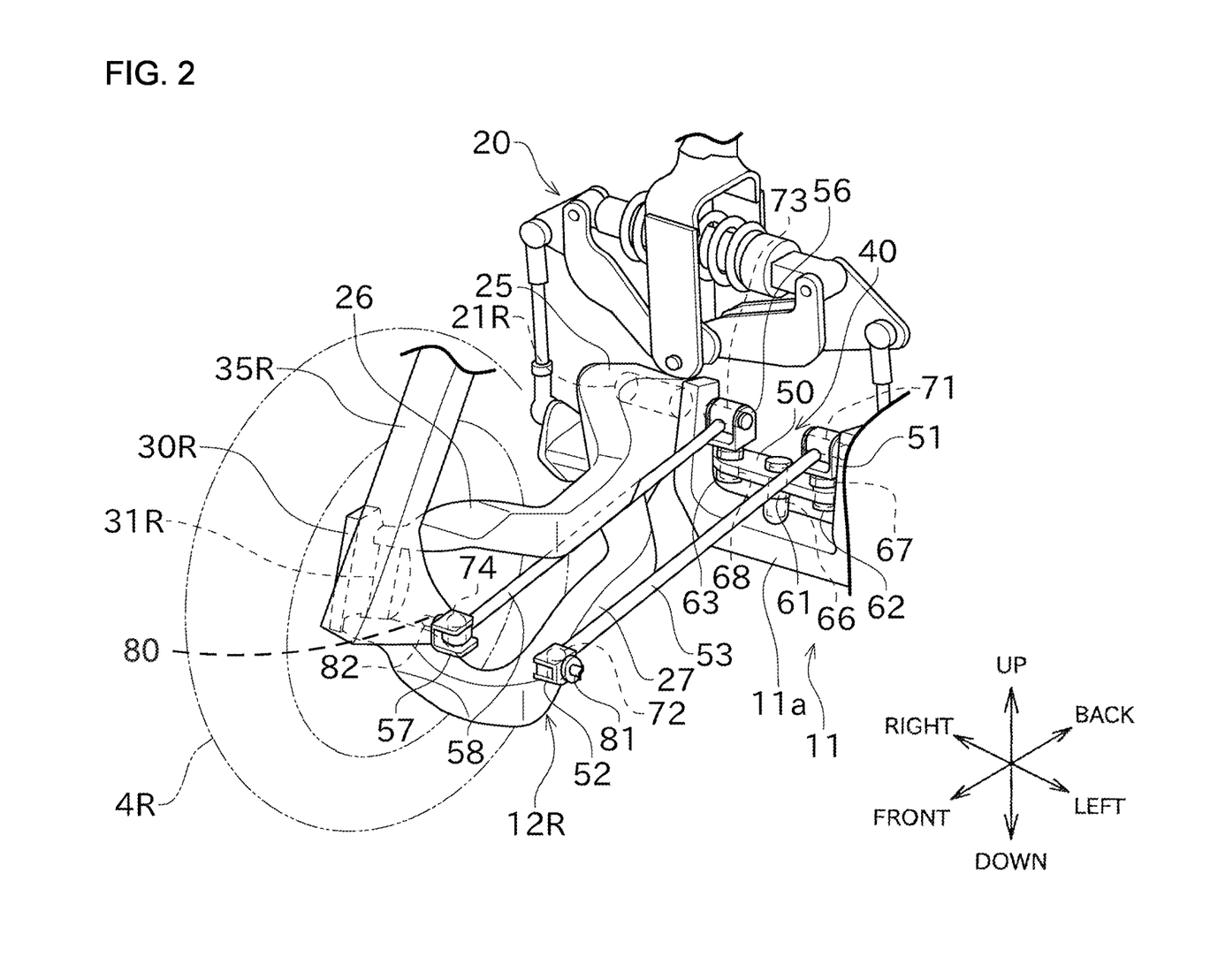
FIG. 2 is a front perspective view showing the configuration of the front of the traveling vehicle.
Figure 3:
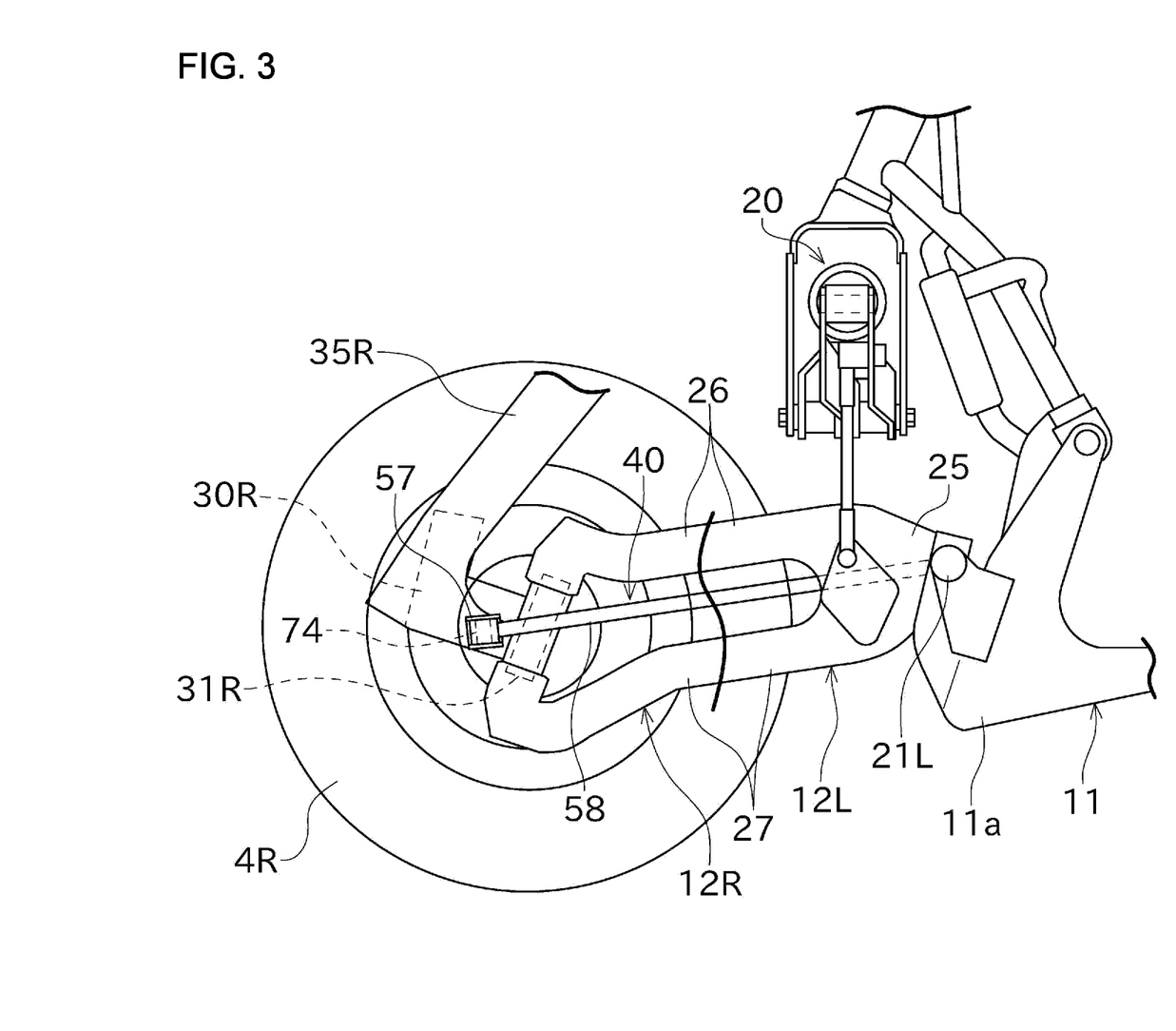
FIG. 3 is a side view showing the configuration of the front of the traveling vehicle.
Figure 4:
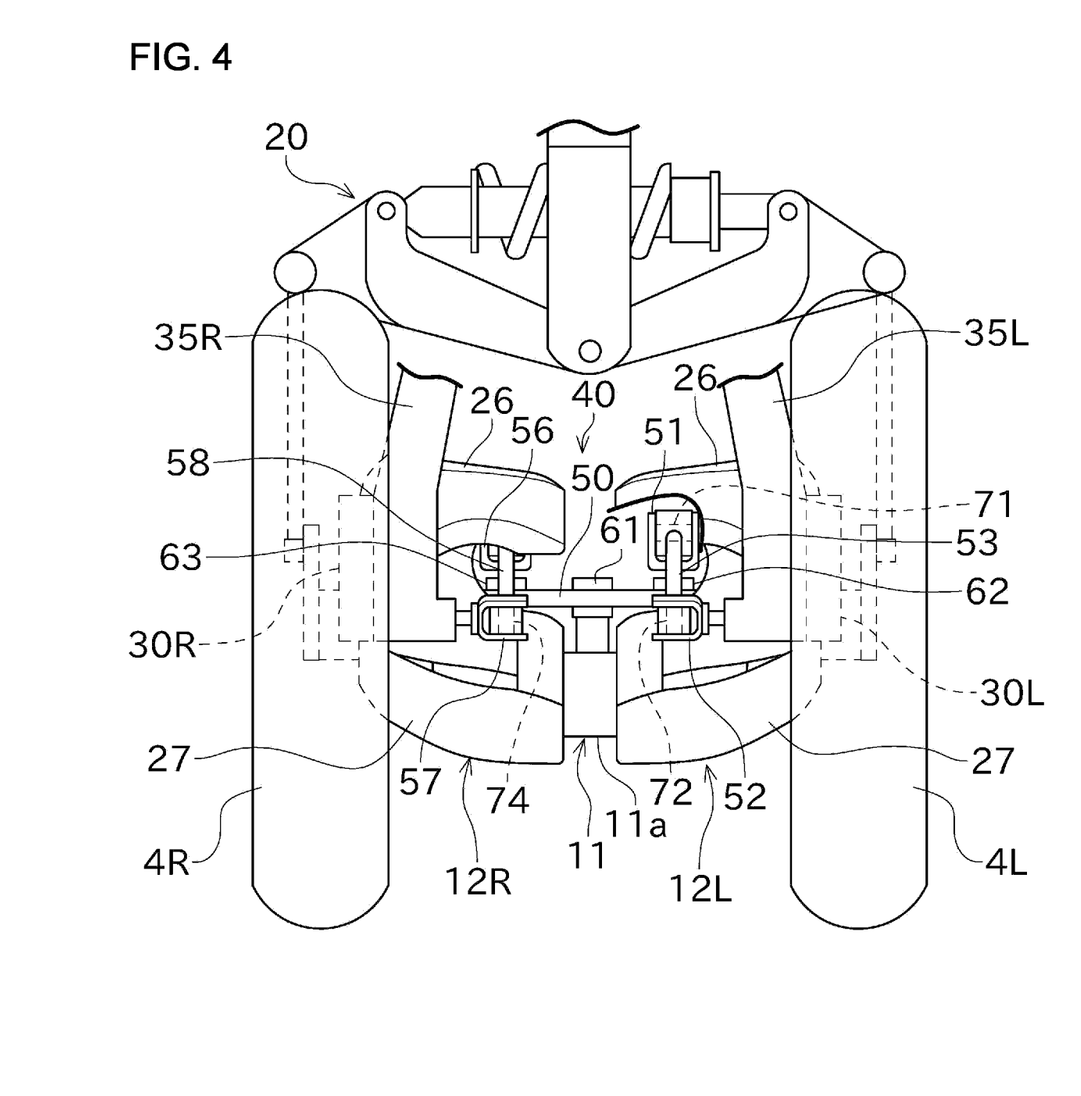
FIG. 4 is a front view showing the configuration of the front of the traveling vehicle.
Figure 5:
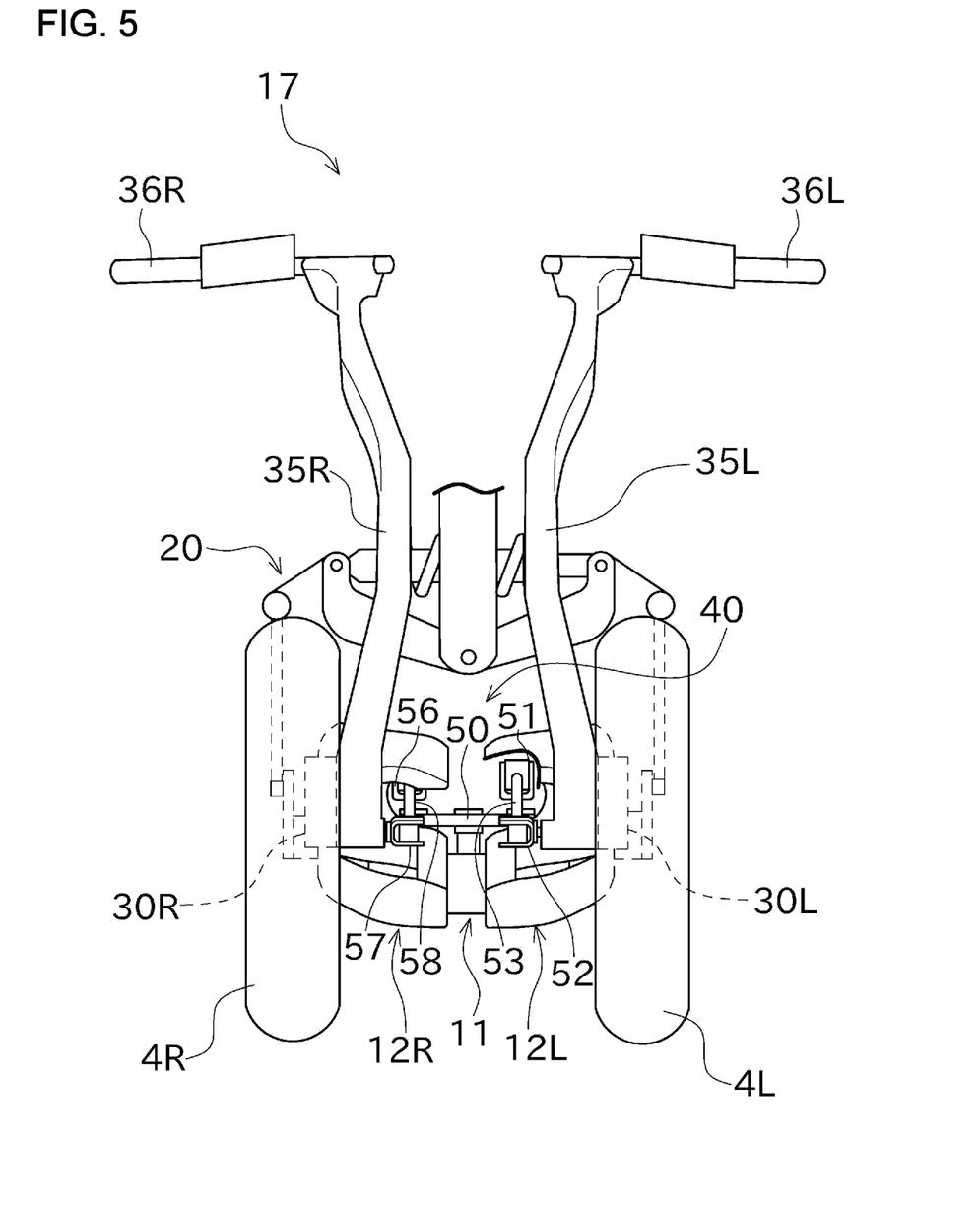
FIG. 5 is a front view showing a non-lean state of a vehicle body.

Next, a configuration of the left and right front wheels 4 and the steering handle 17 will be described with reference to FIGS. 2 to 5. FIG. 2 is a front perspective view showing a configuration of the front part of the traveling vehicle 1. FIG. 3 is a side view showing the configuration of the front part of the traveling vehicle 1. FIG. 4 is a front view showing the configuration of the front part of the traveling vehicle 1. FIG. 5 is a front view showing a non-lean state of the vehicle body 3.

In the following description, as for the left and right front wheels 4, the left wheel may be referred to as "left front wheel 4L" and the right wheel may be referred to as "right front wheel 4R". As for the left and right front wheel arms 12, the left arm may be referred to as "left front wheel arm (left swing part) 12L" and the right arm may be referred to as "right front wheel arm (right swing part) 12R".

The steering handle 17 is a type of handle that can be separated in left and right, and the separated parts are connected to the left and right front wheels 4, respectively. A configuration for supporting the left and right front wheels 4 and a configuration for connecting the steering handle 17 and each of the left and right front wheels 4 are substantially bilaterally symmetric. Therefore, a configuration on the right side of these configurations will be mainly described below.

The right front wheel arm 12R is arranged on a right side, which is one side in the vehicle width direction. The right front wheel arm 12R is provided to extend forward from the vehicle body 3, and is supported by the vehicle body 3 so as to be able to swing in an up-down direction. The right front wheel arm 12R is spaced from the left front wheel arm 12L in the left-right direction so as to be form a predetermined gap. The right front wheel arm 12R is positioned inside in the vehicle width direction compared to the outer surface in the vehicle width direction of the right front wheel 4R.

A base end (rear end) of the right front wheel arm 12R is supported by a front lower part 11*a* of the vehicle body frame 11 of the vehicle body 3. The right front wheel 4R is rotatably provided via a right support part 30R at a distal end (front part) of the right front wheel arm 12R.

The right front wheel arm 12R is swingable about a right swing shaft 21R. The right swing shaft 21R is provided to extend in the left-right direction. The left front wheel arm 12L is supported on the front lower part 11*a* of the vehicle body frame 11, similarly to the right front wheel arm 12R. The left front wheel arm 12L is swingable about a left swing shaft 21L. The right swing shaft 21R is arranged coaxially with the left swing shaft 21L.

In a side view, the right front wheel arm 12R is formed in a lateral substantially Y-shape open the front side. The right front wheel arm 12R includes a swing support part 25, a first protrusion part 26, and a second protrusion part 27.

The swing support part 25 is provided on a rear part of the right front wheel arm 12R. The swing support part 25 constitutes the base end of the right front wheel arm 12R. In a plan view, the swing support part 25 is bent so that the right front wheel arm 12 is inside in the vehicle width direction as it approach the front side. The right swing shaft 21R is arranged at a rear end of the swing support part 25.

The first protrusion part 26 is provided so as to protrude forward from the upper side of a front end of the swing support part 25. A front end of the first protrusion part 26 is positioned inside the right front wheel 4R in the vehicle width direction.

The second protrusion part 27 is provided so as to protrude forward from the lower side of the front end of the swing support part 25. A front end of the second protrusion part 27 is positioned inside the right front wheel 4R in the vehicle width direction.

The first protrusion part 26 and the second protrusion part 27 are arranged side by side in the up-down direction. The right support part 30R is attached to the front end of the first protrusion part 26 and the front end of the second protrusion part 27 so as to straddle them.

The right support part 30R is provided at a front end of the right front wheel arm 12R so as to be rotatable about a right steering shaft 31R. The right support part 30R is arranged inside in the vehicle width direction with respect to a middle portion of the right front wheel 4R. The right steering shaft 31R is provided so as to extend substantially in the up-down direction. The right steering shaft 31R is inclined so that an upper end thereof is positioned rearward than a lower end.

The right front wheel 4R is attached to the right support part 30R. The right front wheel 4R is rotatable about an axle 80 extending in the left-right direction with respect to the right support part 30R. A right handle stem (right extension) 35R included in the steering handle 17 is attached to the right support part 30R. The right support part 30R rotates about the right steering shaft 31R together with the right handle stem 35R.

The steering handle 17 includes a right handle grip (right steering operation part) 36R corresponding to the right handle stem 35R. When the driver operates by gripping the right handle grip 36R, the right support part 30R rotates via the right handle stem 35R. As a result, an orientation of the right front wheel 4R can be changed.

The right handle stem 35R extends obliquely rearward and upward from the right support part 30R (in a direction away from the right front wheel 4R). A base end (lower end) of the right handle stem 35R is fixed to the right support part 30R. The base end of the right handle stem 35R is arranged inside in the vehicle width direction with respect to the right front wheel 4R.

The right handle grip 36R is provided at an upper part of the right handle stem 35R, as shown in FIG. 5. The right handle grip 36R is arranged so as to protrude outward in the vehicle width direction from the right handle stem 35R.

In connection with the left front wheel 4L, the steering handle 17 includes a left handle stem (left extension) 35L and a left handle grip (left steering operation part) 36L. The left and right handle stems 35L, 35R are spaced from each other in the left-right direction.

The left and right handle stems 35L, 35R are respectively connected to the left and right front wheels 4 from the inside in the vehicle width direction. Therefore, regardless of a position of the steering handle 17 with respect to the driver, a distance between the left front wheel 4L and the right front wheel 4R can be easily increased. That is, the positions of the left front wheel 4L and the right front wheel 4R are not restricted by the steering handle 17, and a width between the both wheels 4L and 4R be easily adjusted.

The right handle stem 35R and the left handle stem 35L are coupled via an interlocking link mechanism 40. When one of the left support part 30L and right support part 30R is rotated for steering, the interlocking link mechanism 40 can rotate the opposite in conjunction therewith.

Figure 6:
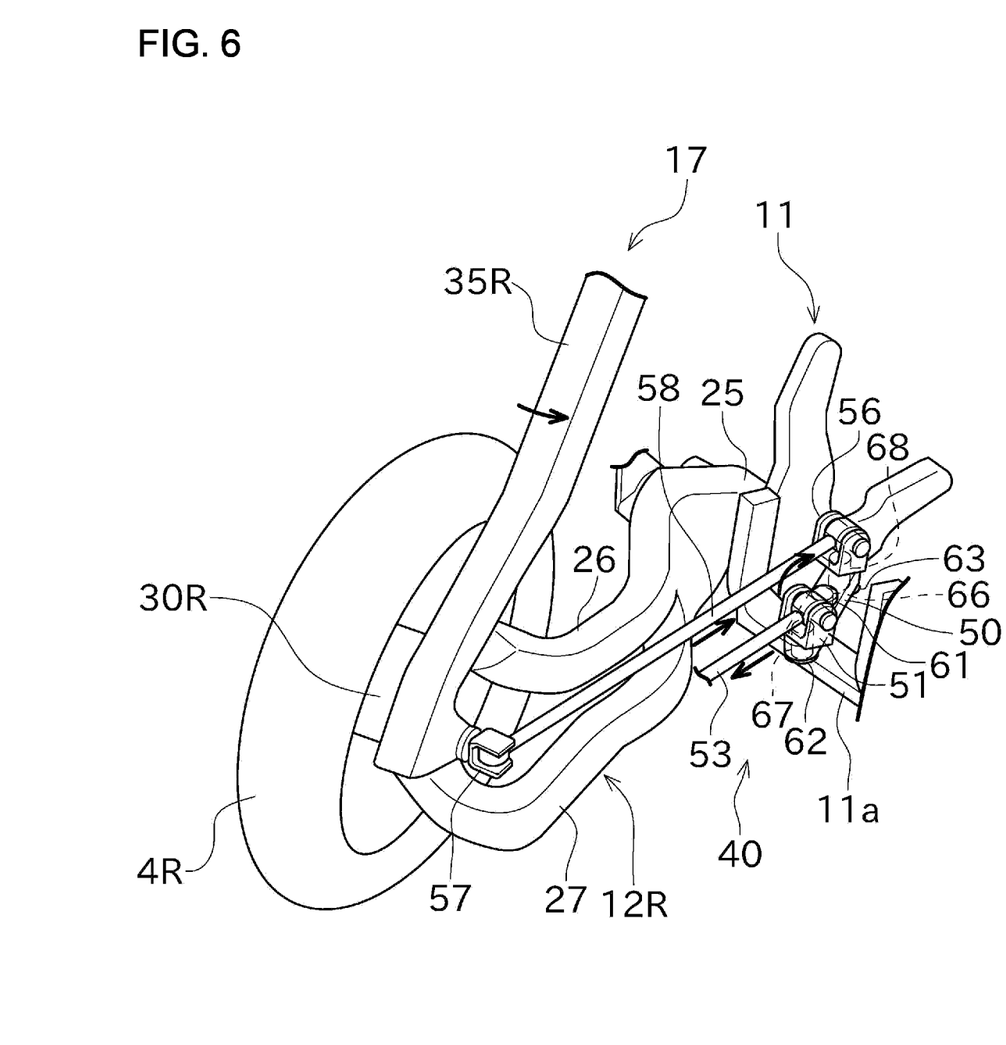
FIG. 6 is a front perspective view showing a state in which the left and right front wheels are turned for steering from neutral state to the left in FIG. 2.
Figure 7:
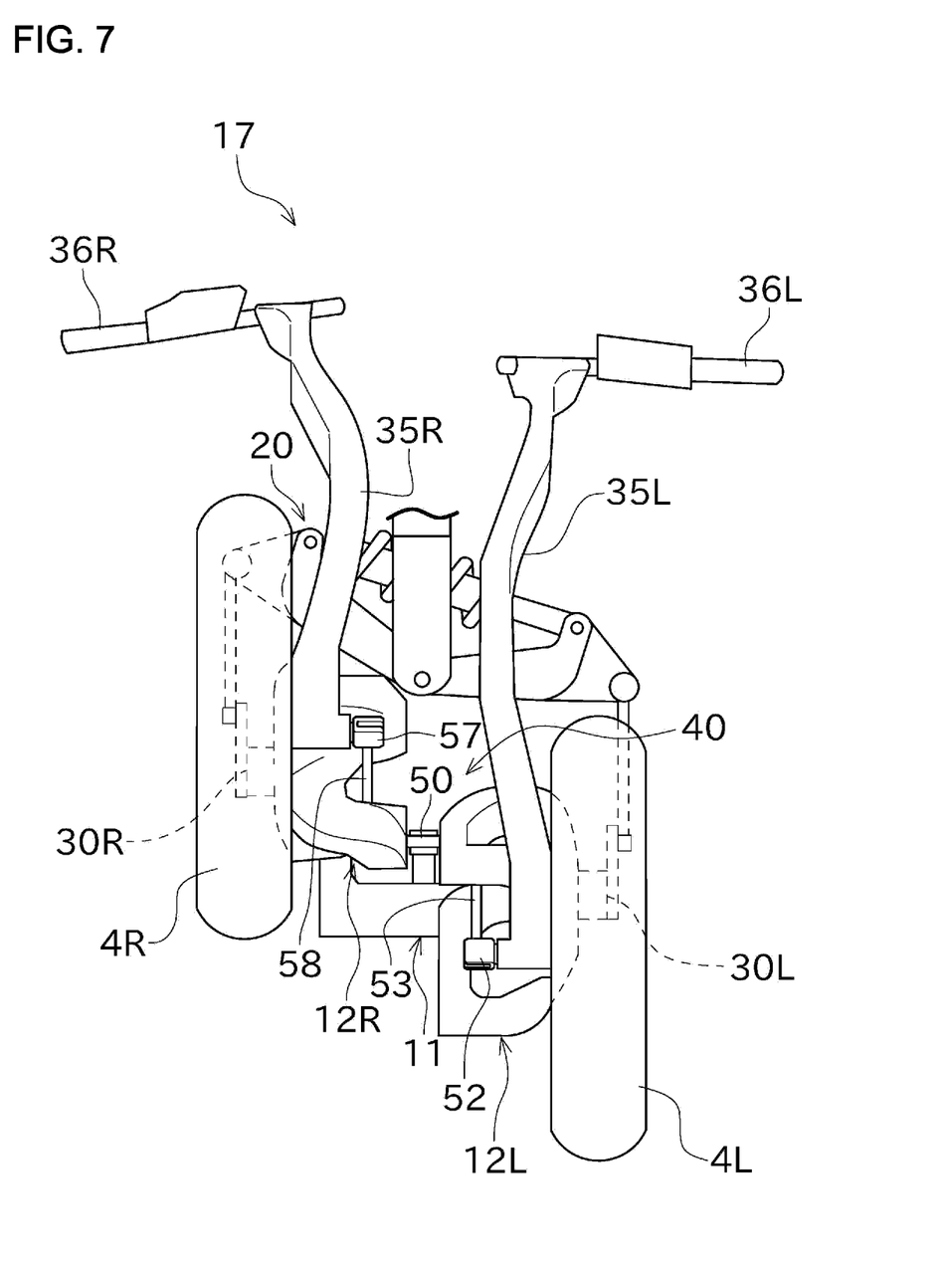
FIG. 7 is a view showing a lean state of the vehicle body.

Next, the interlocking link mechanism 40 will be described with reference to FIGS. 2 to 7. FIG. 6 is a front perspective view showing a state in which the left and right front wheels 4 are turned for steering from the neutral state to the left in FIG. 2. FIG. 7 is a view showing a lean state of the vehicle body 3.

The interlocking link mechanism 40 includes an interlocking arm (rotation base portion) 50, a first left coupling portion 51, a second left coupling portion 52, a left rod 53, a first right coupling portion 56, a second right coupling portion 57, and a right rod 58.

As shown in FIG. 2, the interlocking arm 50 is formed so as to extend linearly. The interlocking arm 50 is arranged between the left front wheel 4L and the right front wheel 4R in a front view. The interlocking arm 50 is arranged so that its longitudinal direction is along the left-right direction in the steering neutral state. A middle part in the longitudinal direction of the interlocking arm 50 is supported on the vehicle body 3 so as to be rotatable about a first rotary shaft 66.

The first rotary shaft 66 is arranged so as to extend in the up-down direction. The first rotary shaft 66 is arranged at the center of the traveling vehicle 1 in the left-right direction.

In this embodiment, the interlocking arm 50 is composed of a flat plate-like member. The interlocking arm 50 is provided with a first boss portion 61, a second boss portion 62, and a third boss portion 63. Each of the first boss portion 61, the second boss portion 62, and the third boss portion 63 is formed in a cylindrical shape. The axes of the first boss portion 61, the second boss portion 62, and the third boss portion 63 are respectively oriented in the up-down direction.

The first boss portion 61 is arranged at the center in the longitudinal direction of the interlocking arm 50. The first rotary shaft 66 is inserted into the first boss portion 61. The first boss portion 61 is supported by the front lower part 11a of vehicle body frame 11 in vehicle body 3 so that the interlocking arm 50 can rotate about the first rotary shaft 66.

The second boss portion 62 is provided at one end in the longitudinal direction of the interlocking arm 50. The second boss portion 62 is arranged on a left side of the first boss portion 61. A second rotary shaft 67 is inserted into the second boss portion 62, and is rotatably supported by the second boss portion 62. The second rotary shaft 67 is arranged so as to extend in the up-down direction.

The third boss portion 63 is provided at the other end in the longitudinal direction of the interlocking arm 50. The third boss portion 63 is arranged on a right side of the first boss portion 61. A third rotary shaft 68 is inserted into the third boss portion 63, and is rotatably supported by the third boss portion 63. The third rotary shaft 68 is arranged so as to extend in the up-down.

The first left coupling portion 51 is a U-shaped member. The first left coupling portion 51 is fixed to an upper end of the second rotary shaft 67 so that the upper side of the first left coupling portion 51 is opened. The first left coupling portion 51 is rotatable with the second rotary shaft 67. When the interlocking arm 50 rotates about the first rotary shaft 66, the first left coupling portion 51 moves with a left part of the interlocking arm 50.

The second left coupling portion 52 is arranged in front of the first left coupling portion 51. The second left coupling portion 52 is a U-shaped member, and is attached to the left handle stem 35L so that the inner side of the second left coupling portion 52 in the vehicle width direction is opened. The second left coupling portion 52 is fixed to an end of a third rotary shaft 81 extending in the left-right direction. The third rotary shaft 81 is rotatably supported by a base end of the left handle stem 35L.

The left rod 53 couples the first left coupling portion 51 and the second left coupling portion 52 so that the interlocking arm 50 and the left support part 30L interlock with each other. The left rod 53 is provided so as to extend in a front-back direction. The left rod 53 extends linearly between the first left coupling portion 51 and the second left coupling portion 52. The left rod 53 is arranged so as to pass through a space formed between the first protrusion part 26 and the second protrusion part 27 of the left front wheel arm 12L in the front-back direction One end (rear part) in the longitudinal direction of left rod 53 is coupled to the first left coupling portion 51 so as to be rotatable about a first coupling shaft 71. The first coupling shaft 71 is arranged so as to extend in the left-right direction (direction perpendicular to the up-down direction). The first coupling shaft 71 is arranged coaxially with left swing shaft 21L of the left front wheel arm 12L in the steering neutral state.

The other end (front part) in the longitudinal direction of left rod 53 is coupled to the second left coupling portion 52 so as to be rotatable about a second coupling shaft 72. The second coupling shaft 72 is arranged so as to extend in the up-down direction.

The first right coupling portion 56 is a U-shaped member. The first right coupling portion 56 is fixed to an upper end of the third rotary shaft 68 so that the upper side of the first right coupling portion 56 is opened. The first right coupling portion 56 is rotatable with the third rotary shaft 68. When the interlocking arm 50 rotates about the first rotary shaft 66, the first right coupling portion 56 moves with the right part of the interlocking arm 50.

The second right coupling portion 57 is arranged in front of the first right coupling portion 56. The second right coupling portion 57 is a U-shaped member, and is attached to the right handle stem 35R so that the inner side of the second right coupling portion 57 in the vehicle width direction is opened. The second right coupling portion 57 is fixed to an end of a fourth rotary shaft 82 extending in the left-right direction. The fourth rotary shaft 82 is rotatably supported by the base end of the right handle stem 35R.

The right rod 58 couples the first right coupling portion 56 and the second right coupling portion 57 so that the interlocking arm 50 and the right support part 30R interlock with each other. The right rod 58 is provided so as to extend in the front-back direction. The right rod 58 extends linearly between the first right coupling portion 56 and the second right coupling portion 57. The right rod 58 is arranged so as to pass through a space formed between the first protrusion 26 and the second protrusion 27 of the right front wheel arm 12R in the front-back direction One end (rear part) in the longitudinal direction of the right rod 58 is coupled to the first right coupling portion 56 so as to be rotatable about a third coupling shaft 73. The third coupling shaft 73 is arranged so as to extend in the left-right direction (direction perpendicular to the up-down direction). The third coupling shaft 73 is arranged coaxially with right swing shaft 21R of the right front wheel arm 12R in the steering neutral state.

The other end (front part) in the longitudinal direction of the right rod 58 is coupled to the second right coupling portion 57 so as to be rotatable about a fourth coupling shaft 74. The fourth coupling shaft 74 is arranged so as to extend in the up-down direction.

With the interlocking link mechanism 40 configured as described above, in conjunction with rotating one of the left support part 30L and right support part 30R by steering handle 17, it is possible to rotate the other. For example, in the steering neutral state shown in FIG. 2, consider a case where the driver operates the right steering wheel 17 to rotate the right support part 30R for steering to the left. In this case, the right rod 58 is moved rearward in response to the rotation of the right handle stem 35R, and the interlocking arm 50 rotates clockwise about the first rotary shaft 66 in plan view. As a result, the left rod 53 moves forward, and the left support part 30L can be rotated together with the left handle stem 35L. Therefore, the steering angle of the right front wheel 4R and the steering angle of the left front wheel 4L can be changed in cooperation with each other, and the operability regarding steering is good.

Next, the lean of vehicle body 3 will be described. In the state shown in FIG. 5, the traveling vehicle 1 can tilt the vehicle body 3 in the left-right direction by raising one of the left and right front wheel arms 12 and lowering the other. At this time, the suspension device 20 functions as a kind of link mechanism, and when one of the left and right front wheel arm 12 rises, the other is lowered. FIG. 7 shows a state in which the heights of the left and right front wheels 4 are different. In order to facilitate comparison with FIG. 5, the vehicle body 3 is drawn upright in FIG. 7, but in reality, the vehicle body 3 leans according to the difference in height between the left and right front wheels 4 shown in FIG. 7.

In the steering neutral state, the first coupling shaft 71 and the third coupling shaft 73 are substantially oriented in the left-right direction. Similarly, the third and fourth rotary shafts 81, 82 are also oriented substantially in the left-right direction. Thus, the left rod 53 of the interlocking link mechanism 40 swings according to the swing of the left front wheel arm 12L, and the right rod 58 swings according to the swing of the right front wheel arm 12R. Therefore, regardless of the lean/non-lean state of the vehicle body 3, the steering angle of the left and right front wheel 4 can be changed in conjunction with each other with the interlocking link mechanism 40. Further, in this embodiment, at the time of steering neutral, left swing shaft 21L, the first coupling shaft 71, the third coupling shaft 73 and right swing shaft 21R are all arranged coaxially. Therefore, even when vehicle body 3 is lean, the left and right front wheels 4 can be smoothly interlocked by efficiently transmitting the force between the left support part 30L and the right support part 30R.

As above, the right front wheel arm 12R is formed laterally in a substantially Y shape, and the right support part 30R is attached to the front ends of the right front wheel arm 12R which is branched into two so as to straddle the front ends. Therefore, a structure having high mechanical strength can be obtained by combining the right front wheel arm 12R and the right support part 30R. As a result, the right front wheel 4R can be reliably supported. Further, since the right rod 58 passes between the two branched parts of the right front wheel arm 12R, a compact structure can be realized as a whole. The same applies to the left front wheel arm 12L.

As described above, the traveling vehicle 1 of this embodiment includes the vehicle body 3, the left front wheel arm 12L, the right front wheel arm 12R, the left support part 30L, the left front wheel 4L, the right support part 30R, the right front wheel 4R, and the interlocking link mechanism 40. The left front wheel arm 12L is arranged on one side in the vehicle width direction, is provided so as to extend forward from the vehicle body 3, and is supported on the vehicle body 3 so as to be swingable in an up-down direction. The right front wheel arm 12R is arranged on the other side in the vehicle width direction, is provided so as to extend forward from the vehicle body 3, and is supported on the vehicle body 3 so as to be swingable in an up-down direction. The left support part 30L is provided on a front part of the left front wheel arm 12L so as to be rotatable about the left steering shaft 31L. The left front wheel 4L is rotatably supported by the left support part 30L and is configured to change an orientation of the left front wheel 4L by rotation of the left support part 30L about the left steering shaft 31L. The right support part 30R is provided on a front part of the right front wheel arm 12R so as to be rotatable about the right steering shaft 31R. The front right wheel 4R is rotatably supported by the right support part 30R and is configured to change the orientation of the front right wheel 4R by rotation of the right support part 30R about the right steering shaft 31R. The interlocking link mechanism 40 is configured to rotate one of the left support part 30L and the right support part 30R in conjunction with the other when the other of the left support part 30L and the right support part 30R rotates. The interlocking link mechanism 40 is provided between the left support part 30L and the right support part 30R.

Thus, in the traveling vehicle 1 including the left front wheel 4L and the right front wheel 4R, it is possible to realize that the vehicle body 3 leans. Further, based on the rotation of one of the left support part 30L and the right support part 30R, the rotation state of the other of the left support part 30L and the right support part 30R can be changed. That is, based on the steering angle of one of the left front wheel 4L and the right front wheel 4R corresponding to the one of the left support part 30L and the right support part 30R, the steering angle of the other of the left front wheel 4L and the right front wheel 4R corresponding to the other of the left support part 30L and the right support part 30R can be changed. Therefore, with respect to the steering of the traveling vehicle 1, good operability can be realized.

In the traveling vehicle 1 of this embodiment, the interlocking link mechanism 40 includes the interlocking arm 50, the first left coupling portion 51, the second left coupling portion 52, the left rod 53, the first right coupling portion 56, the second right coupling portion 57, and the right rod 58. The interlocking arm 50 is supported on the vehicle body 3 at the center of the vehicle body 3 in the vehicle width direction so as to be rotatable about a first rotary shaft extending in the up-down direction. The first left coupling portion 51 is provided on the left part of the interlocking arm 50 so as to be rotatable about the second rotary shaft 67 extending in the up-down direction. The second left coupling portion 52 is rotatable integrally with the left support part 30L about the left steering shaft 31L. The left rod 53 extends in the front-back direction and couples the first left coupling portion 51 and the second left coupling portion 52 so that the interlocking arm 50 and the left support part 30L are interlocked with each other. The first right coupling portion 56 is provided on the right part of the interlocking arm 50 so as to be rotatable about the third rotary shaft 68 extending in the up-down direction. The second right coupling portion 57 is rotatable integrally with the right support part 30R about the right steering shaft 31R. The right rod 58 extends in the front-back direction and couples the first right coupling portion 56 and the second right coupling portion 57 so that the interlocking arm 50 and the right support part 30R are interlocked with each other.

Thus, the interlocking link mechanism 40 can be simply configured for the left front wheel 4L and the right front wheel 4R.

In the traveling vehicle 1 of this embodiment, the first rotary shaft 66 is arranged at the center of the vehicle body 3 in the vehicle width direction.

Thus, the interlocking link mechanism 40 can be operated satisfactorily. Further, it is easy to change the orientations of the two front wheels 4 symmetrically during left and right steering.

In the traveling vehicle 1 of this embodiment, the rear part of the left rod 53 is coupled to the first left coupling portion 51 so as to be rotatable about a first coupling shaft 71 extending in a direction perpendicular to the up-down direction. The front part of the left rod 53 is coupled to the second left coupling portion 52 so as to be rotatable about a second coupling shaft 72 extending in the up-down direction. The rear part of the right rod 58 is coupled to the first right coupling portion 56 so as to be rotatable about a third coupling shaft 73 extending in a direction perpendicular to the up-down direction. The front part of the right rod 58 is coupled to the second right coupling portion 57 so as to be rotatable about a fourth coupling shaft 74 extending in the up-down direction.

Thus, the interlocking link mechanism 40 using the left rod 53 and the right rod 58 can be smoothly operated.

In the traveling vehicle 1 of this embodiment, the left front wheel arm 12L is supported on the vehicle body 3 about left swing shaft 21L extending in the vehicle width direction. The left swing shaft 21L is arranged coaxially with the first coupling shaft 71 in the steering neutral state. The right front wheel arm 12R is supported on the vehicle body 3 about a right swing shaft 21R extending in the vehicle width direction. The right swing shaft 21R is arranged coaxially with the third coupling shaft 73 in the steering neutral state.

Thus, the interlocking link mechanism 40 can be smoothly operated even when the vehicle body 3 is lean.

Further, traveling vehicle 1 of this embodiment includes the handle stem 35L, the handle grip 36L, the handle stem 35R, and the handle grip 36R. The handle stem 35L extends in the direction away from the left support part 30L with respect to the left front wheel 4L. The handle grip 36L is provided on the handle stem 35L and can be gripped by the driver. The handle stem 35 R extends in the direction away from the right support part 30R with respect to the right front wheel 4R. The handle grip 36R is provided on the handle stem 35R and can be gripped by the driver.

Thus, the steering operation using at least one of the left handle grip 36L and the right handle grip 36R can directly change the orientation of the left front wheel 4L and the right front wheel 4R. Therefore, when changing the orientation of the left front wheel 4L and right front wheel 4R, a good operation feeling can be realized.

In the traveling vehicle 1 of this embodiment, each of the left front wheel arm 12L and right front wheel arm 12R includes the swing support part 25, a first protrusion part 26, and a second protrusion part 27. The swing support part 25 is supported on vehicle body 3 so as to be swingable. The first protrusion part 26 protrudes forward from the swing support part 25. The second protrusion part 27 is arranged below the first protrusion part 26 and protrudes forward from the swing support part 25. The left support part 30L is attached to the first protrusion part 26 and the second protrusion 27 of the left front wheel arm 12L. The right support part 30R is attached to the first protrusion part 26 and the second protrusion 27 of the right front wheel arm 12R.

Thus, another component (for example, the left rod 53 or the right rod 58, which is a component of the interlocking link mechanism 40) can be arranged between the first protrusion part 26 and the second protrusion part 27. Therefore, a compact structure can be realized as a whole. Further, sufficient strength can be secured for each of the left front wheel arm 12L and the right front wheel arm 12R.

Although a preferred embodiment of the present invention has been described above, the configuration described above can be modified, for example, as follows.

The left support part 30L may be integrally formed with the left handle stem 35L. The right support part 30R may be integrally formed with the right handle stem 35R.

The interlocking arm 50 is not limited to a linear arm, but may be configured as a V-shaped arm, for example.

The left rod 53 and the right rod 58 may be arranged parallel to each other in a plan view at the steering neutral state, or may be arranged not to be parallel to each other.

The interlocking link mechanism 40 is not limited to being applied to a saddle-ride type vehicle, but can be applied to other types of traveling vehicles as long as each of them has the left and right front wheels 4.

A steering handle attached to the interlocking arm 50 of the interlocking link mechanism 40 may be adopted. In this case, the steering handle includes a steering shaft (extension) extending upward from the interlocking arm 50 (in a direction away from the interlocking arm 50), and a handle grip (steering operation) which is provided on the steering shaft and which can be gripped by the driver.

Obviously, numerous modifications and variations of the present invention are possible in light of the above teachings. It is therefore to be understood that within the scope of the appended claims, the invention may be practiced otherwise than as specifically described herein.

What is claimed is:

1. A traveling vehicle, comprising:
a vehicle body;
a left swing part which is arranged on one side in a vehicle width direction, which is provided so as to extend forward from the vehicle body, and which is supported on the vehicle body so as to be swingable in an up-down direction;
a right swing part which is arranged on the other side in the vehicle width direction, which is provided so as to extend forward from the vehicle body, and which is supported on the vehicle body so as to be swingable in the up-down direction;
a left support part which is provided on a front part of the left swing part so as to be rotatable about a left steering shaft;

a left front wheel which is rotatably supported by the left support part and which is configured to change an orientation of the left front wheel by rotation of the left support part about the left steering shaft, a right support part which is provided at a front part of the right swing part so as to be rotatable about a right steering shaft;

a right front wheel which is rotatably supported by the right support part and which is configured to change an orientation of the right front wheel by rotation of the right support part about the right steering shaft;

a steering operation part to be gripped by a driver which is swingable in the up-down direction along with the left and right front wheels; and an interlocking link mechanism which is configured to rotate one of the left support part and the right support part in conjunction with the other when the other of the left support part and the right support part rotates, wherein the interlocking link mechanism is provided between the left support part and the right support part.

2. The traveling vehicle according to claim 1, wherein the interlocking link mechanism includes:

a rotation base portion which is supported on the vehicle body at a center of the vehicle body in the vehicle width direction so as to be rotatable about a first rotary shaft extending in the up-down direction;

a first left coupling portion which is provided on a left part of the rotation base portion so as to be rotatable about a second rotary shaft extending in the up-down direction;

a second left coupling portion which is rotatable integrally with the left support part about the left steering shaft;

a left rod that extends in a front-back direction and couples the first left coupling portion and the second left coupling portion so that the rotation base portion and the left support part are interlocked with each other;

a first right coupling portion which is provided on a right part of the rotation base portion so as to be rotatable about a third rotary shaft extending in the up-down direction;

a second right coupling portion which is rotatable integrally with the right support part about the right steering shaft; and a right rod that extends in the front-back direction and couples the first right coupling portion and the second right coupling portion so that the rotation base portion and the right support part are interlocked with each other.

3. The traveling vehicle according to claim 2, wherein the first rotary shaft is arranged at the center of the vehicle body in the vehicle width direction.

4. The traveling vehicle according to claim 2, wherein a rear part of the left rod is coupled to the first left coupling portion so as to be rotatable about a first coupling shaft extending in a direction perpendicular to the up-down direction, wherein a front part of the left rod is coupled to the second left coupling portion so as to be rotatable about a second coupling shaft extending in the up-down direction, wherein a rear part of the right rod is coupled to the first right coupling portion so as to be rotatable about a third coupling shaft extending in the direction perpendicular to the up-down direction, and wherein a front part of the right rod is coupled to the second right coupling portion so as to be rotatable about a fourth coupling shaft extending in the up-down direction.

5. The traveling vehicle according to claim 4, wherein the left swing part is supported on the vehicle body about a left swing shaft extending in the vehicle width direction, wherein the left swing shaft is arranged coaxially with the first coupling shaft in in a steering neutral state, wherein the right swing part is supported on the vehicle body about a right swing shaft extending in the vehicle width direction, and wherein the right swing shaft is arranged coaxially with the third coupling shaft in the steering neutral state.

6. The traveling vehicle according to claim 2, further comprising:

an extension extending in a direction away from the rotation base portion, wherein the steering operation part is provided on the extension.

7. The traveling vehicle according to claim 1, further comprising:

a left extension extending in a direction away from the left support part with respect to the left front wheel;

a left steering operation portion of the steering operation part is provided on the left extension and which can be gripped by the driver;

a right extension extending in a direction away from the right support part with respect to the right front wheel; and a right steering operation portion of the steering operation part is provided on the right extension and which can be gripped by the driver.

8. The traveling vehicle according to claim 1, wherein each of the left swing part and the right swing part includes:

a swing support part supported on the vehicle body so as to be swingable;

a first protrusion part protruding forward from the swing support part; and a second protrusion part which is arranged below the first protrusion part and which protrudes forward from the swing support part, wherein the left support part is attached to the first protrusion part and the second protrusion of the left swing part, and wherein the right support part is attached to the first protrusion part and the second protrusion part of the right swing part.

9. The traveling vehicle according to claim 1, wherein the steering operation part swings in the up-down direction when the left swing part or the right swing part swings.

10. The traveling vehicle according to claim 1, wherein the interlocking link mechanism comprises:

a left rod which is swingable about a shaft arranged coaxially with a shaft which the left swing part swings; and a right rod which is swingable about a shaft arranged coaxially with a shaft which the right swing part swings.

11. The traveling vehicle according to claim 10, wherein the left rod is located between an upper side and a lower side of the left swing part and the right rod is located between an upper side and a lower side of the right swing part.

12. The traveling vehicle according to claim 1, where each of the left swing part and the right swing part includes:

a swing support part supported on the vehicle body so as to be swingable;

a first protrusion part protruding forward from the swing support part; and a second protrusion part protruding forward from the swing support part.

13. The traveling vehicle according to claim 12, wherein the first protrusion part and the second protrusion part are branched from the swing support part.

14. The traveling vehicle according to claim 12, further comprises:
- a left extension extending in a direction away from the left support part with respect to the left front wheel;
- a left steering operation portion of the steering operation part is provided on the left extension and which can be gripped by the driver;
- a right extension extending in a direction away from the right support part with respect to the right front wheel; and
- a right steering operation portion of the steering operation part is provided on the right extension and which can be gripped by the driver.

15. The traveling vehicle according to claim 14, wherein the left steering operation part swings independently from the right steering operation part when the left swing part swings.

16. The traveling vehicle according to claim 14, wherein the right steering operation part swings independently from the left steering operation part when the right swing part swings.

17. The traveling vehicle according to claim 1, wherein the steering operation part is gripped by one hand of the driver.

18. A traveling vehicle, comprising:
- a vehicle body;
- a left swing part which is arranged on one side in a vehicle width direction, which is provided so as to extend forward from the vehicle body, and which is supported on the vehicle body so as to be swingable in an up-down direction;
- a right swing part which is arranged on the other side in the vehicle width direction, which is provided so as to extend forward from the vehicle body, and which is supported on the vehicle body so as to be swingable in the up-down direction;
- a left support part which is provided on a front part of the left swing part so as to be rotatable about a left steering shaft;
- a left front wheel which is rotatably supported by the left support part and which is configured to change an orientation of the left front wheel by rotation of the left support part about the left steering shaft,
- a right support part which is provided at a front part of the right swing part so as to be rotatable about a right steering shaft;
- a right front wheel which is rotatably supported by the right support part and which is configured to change an orientation of the right front wheel by rotation of the right support part about the right steering shaft;
- an interlocking link mechanism which is configured to rotate one of the left support part and the right support part in conjunction with the other when the other of the left support part and the right support part rotates, wherein the interlocking link mechanism is provided between the left support part and the right support part,
wherein the interlocking link mechanism includes:
- a rotation base portion which is supported on the vehicle body at a center of the vehicle body in the vehicle width direction so as to be rotatable about a first rotary shaft extending in the up-down direction;
- a first left coupling portion which is provided on a left part of the rotation base portion so as to be rotatable about a second rotary shaft extending in the up-down direction;
- a second left coupling portion which is rotatable integrally with the left support part about the left steering shaft;
- a left rod that extends in a front-back direction and couples the first left coupling portion and the second left coupling portion so that the rotation base portion and the left support part are interlocked with each other;
- a first right coupling portion which is provided on a right part of the rotation base portion so as to be rotatable about a third rotary shaft extending in the up-down direction;
- a second right coupling portion which is rotatable integrally with the right support part about the right steering shaft; and
- a right rod that extends in the front-back direction and couples the first right coupling portion and the second right coupling portion so that the rotation base portion and the right support part are interlocked with each other, wherein a rear part of the left rod is coupled to the first left coupling portion so as to be rotatable about a first coupling shaft extending in a direction perpendicular to the up-down direction, wherein a front part of the left rod is coupled to the second left coupling portion so as to be rotatable about a second coupling shaft extending in the up-down direction, wherein a rear part of the right rod is coupled to the first right coupling portion so as to be rotatable about a third coupling shaft extending in the direction perpendicular to the up-down direction, and wherein a front part of the right rod is coupled to the second right coupling portion so as to be rotatable about a fourth coupling shaft extending in the up-down direction; and wherein the left swing part is supported on the vehicle body about a left swing shaft extending in the vehicle width direction, wherein the left swing shaft is arranged coaxially with the first coupling shaft in in a steering neutral state, wherein the right swing part is supported on the vehicle body about a right swing shaft extending in the vehicle width direction, and wherein the right swing shaft is arranged coaxially with the third coupling shaft in the steering neutral state.

* * * * *